United States Patent

[11] 3,634,037

[72] Inventor Robert J. J. Hamblin
    Deerfield, Ill.
[21] Appl. No. 786,171
[22] Filed Dec. 23, 1968
[45] Patented Jan. 11, 1972
[73] Assignee Universal Oil Products Company
    Des Plaines, Ill.

[54] TREATMENT OF A WATER STREAM CONTAINING AMMONIUM SULFIDE SALTS
    9 Claims, 1 Drawing Fig.

[52] U.S. Cl. .................................................. 23/224, 23/193
[51] Int. Cl. .................................................. C01b 17/00, C01c 1/20
[50] Field of Search ........................................ 23/224, 193; 208/212, 218

[56] References Cited
    UNITED STATES PATENTS
    1,656,563  1/1928  Koppe ............................ 23/224
    3,335,071  8/1967  Bollen et al. .................... 23/225 X
    3,457,046  7/1969  Hoekstra ......................... 23/224

Primary Examiner—Oscar R. Vertiz
Assistant Examiner—G. O. Peters
Attorneys—James R. Hoatson, Jr. and Thomas K. McBride ABSTRACT: A water stream containing $NH_4HS$ is treated to produce elemental sulfur, an ammoniacal aqueous stream and a treated water stream by the steps of: (a) catalytically treating the water stream with an airstream to produce an effluent stream containing ammonium polysulfide, $N_2$ and unreacted $NH_4HS$; (b) separating the effluent stream from step (a) into a vent gas stream and a water stream; (c) decomposing the polysulfide contained in the water stream from step (b) to produce a vapor stream and a bottom stream containing elemental sulfur; (d) separating sulfur from the bottom stream from step (c) to form a treated water stream; (e) recovering a first portion of the treated water stream from step (d) as a product stream; (f) using a second portion of the treated water stream from step (d) to scrub the vent gas stream from step (b) in order to remove $NH_3$ and $H_2S$ therefrom; (g) fractionating the overhead vapor stream from step (c) and the bottom stream from the scrubbing step to form an ammoniacal aqueous overhead stream and an aqueous bottom stream containing essentially all of the unreacted sulfide present in the effluent stream from the treating step; and, (h) recycling the bottom stream from step (g) to step (a). Key feature is the use of a scrubbing step on the vent gases from the treating step operated at a relatively low pressure and a relatively high-liquid gas loading, coupled with a combination scrubbing and fractionating step on the bottom stream from the scrubbing step and on the vapor stream from the polysulfide decomposition step. This combination scrubbing and fractionating step is operated at a relatively high pressure, thereby increasing the amount of $H_2S$ that can be absorbed. The principle advantages of the resulting process are significant improvements in the amount of ammonia and sulfur recovered and a substantial simplification of the overall process.

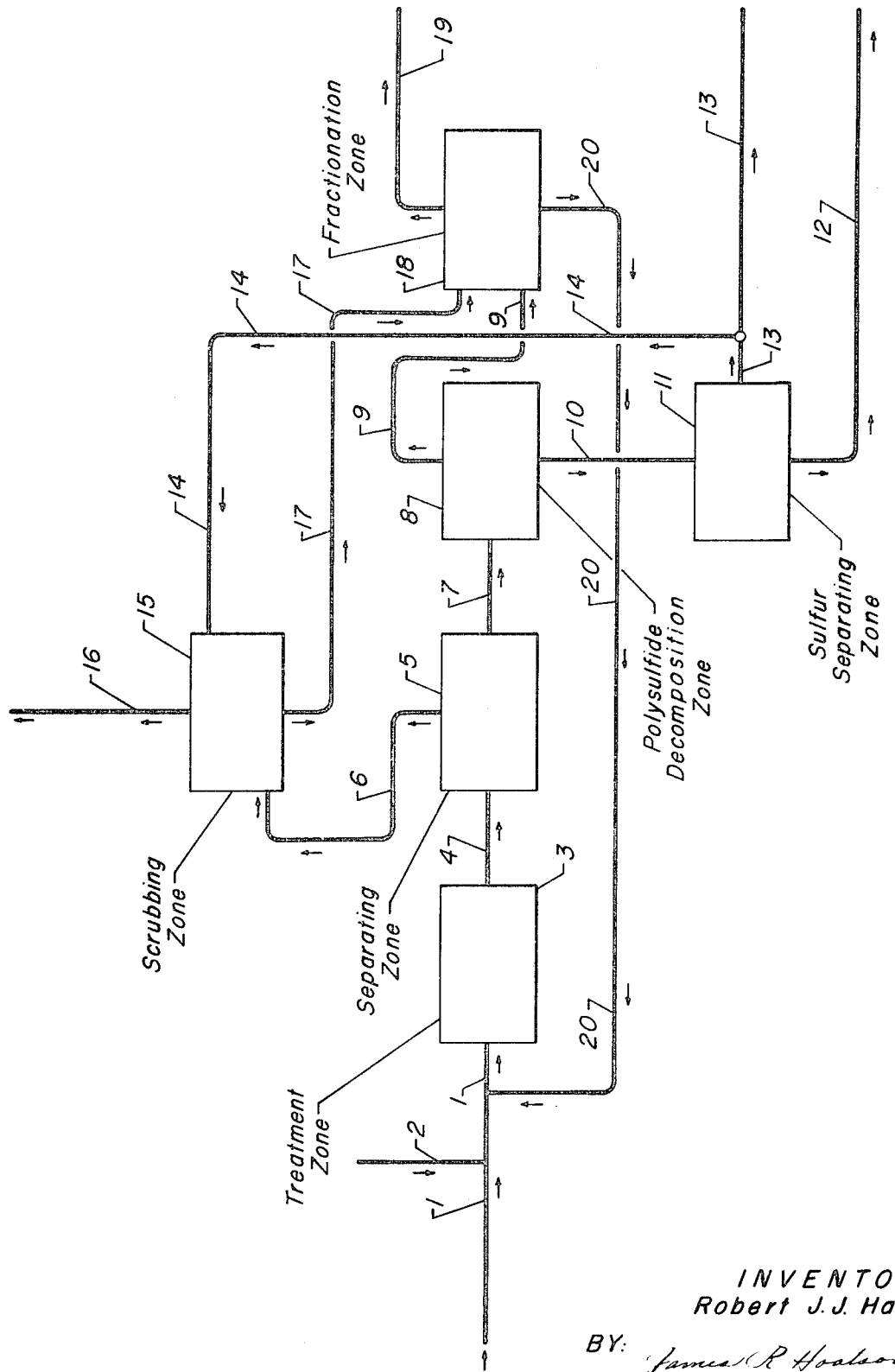

TREATMENT OF A WATER STREAM CONTAINING AMMONIUM SULFIDE SALTS

The subject of the present invention is a process for the treatment of a water stream containing an ammonium sulfide salt in order to produce elemental sulfur, an ammonia-containing stream, and a treated water stream which is substantially free of sulfide. More precisely, in one aspect the present invention is directed at the solution of the problem caused by the loss of $NH_3$ and $H_2S$ in the vent gases from a catalytic treatment process which uses air to oxidize sulfide to sulfur. In another aspect, the present invention provides a significant improvement in a process of this type by significantly reducing the complexity of the equipment necessary for its implementation. Specifically, the present invention combines a scrubbing step with a fractionation step in such a manner as to enable significant increases in the economics and performance of the resulting process.

The concept of the present invention developed from my efforts directed towards the solution of a substantial water pollution problem that is caused by the production and indiscriminate discharge of water streams containing ammonium sulfide salts. These streams are side products in a number of economically significant industrious processes in the chemical, petroleum, paper pulp, steel, and the like industries. A case in point is the petroleum industry where a water stream is typically utilized to remove ammonium hydrosulfide salts from the effluent equipment trains associated with such common conversion processes as hydrorefining, hydrocracking, catalytic cracking, etc. In these processes ammonia and hydrogen sulfide side products are typically produced in the hydrocarbon conversion step and if not removed in some manner, can precipitate in the cooling means utilized to reduce the temperature of the effluent stream from the hydrocarbon conversion step. A water stream is, therefore, typically injected into the effluent train of heat transfer equipment associated with these processes in order to remove these detrimental ammonium hydrosulfide salts before they clog up the equipment. Likewise, there are a number of other sources of these sulfide-containing water streams in other industries.

Regardless of the source of the water stream containing ammonium sulfide salts, its disposal involves a substantial pollution hazard because it contains sulfide which has a substantial biological oxygen demand and ammonia which is a nutrient that leads to excessive growth of stream vegetation.

One solution commonly used in the prior art to control the pollution problem caused by the indiscriminate disposal of these water streams containing ammonium sulfide salts is to strip a gas stream containing $NH_3$ and $H_2S$ therefrom, separately treat the resulting gas stream by techniques well known to those skilled in the art to recover elemental sulfur, sulfuric acid, ammonium sulfide or other similar products, and recycle the stripped water to the point of origin of the stream. Another solution which has been used is to sufficiently dilute the sulfur-containing water stream with fresh water so that the concentration of sulfide salts in the combined stream is reduced to a level wherein it is relatively innocuous, thereby allowing the combined stream to be discharged into a suitable sewer, river, or convenient water body. Still another approach to the solution of this pollution problem has been directed towards a water-treating process which would allow recovery of the commercially valuable elemental sulfur and ammonia directly from the water stream by a controlled oxidation method. A comprehensive investigation of alternative methods for direct oxidation of the sulfide salts contained in this water stream to allow recovery of elemental sulfur has shown that a preferred method involves the use of a solid catalyst and an airstream in an oxidation step operated at conditions selected to form ammonium polysulfide. An essential condition for the formation of ammonium polysulfide is the reaction in the oxidation step of oxygen in an amount less than the stoichiometric amount of oxygen required to oxidize all of the sulfide charged to this step to sulfur. Consequently, in this method the effluent stream recovered from the oxidation step comprises $N_2$, possibly some unreacted $O_2$, and an aqueous solution of ammonium polysulfide and unreacted sulfide. The presence of unreacted sulfide and of the sulfide associated in the polysulfide in the effluent stream from the oxidation step causes a number of problems in the actual practice of this method. One problem involves recovery of a portion of the unreacted sulfide from a vent gas stream that is separated from this effluent stream immediately after the oxidation step. It has been demonstrated that substantial amounts of $H_2S$ and $NH_3$ can be lost from this system in this vent gas stream with resulting diminution of the yield of sulfur and ammonia. Likewise, when the water stream containing ammonium polysulfide which is recovered from the gas separation step, is subsequently subjected to a polysulfide decomposition step to produce an overhead vapor stream containing $NH_3$, $H_2S$ and $H_2O$ and a bottom stream containing elemental sulfur and treated water, the presence of sulfide in the overhead stream can cause a substantial purification problem where it is desired to recover therefrom an ammoniacal stream that is substantially free of sulfide and, additionally, can cause a further diminution of sulfur yield. Accordingly, the basic problem addressed by the present invention involves the recovery and recycle in an optimum manner of the sulfide present in the effluent stream produced in this oxidation step. An attendant problem involves the purification of the ammonia-containing stream recovered from the process.

I have now determined that a convenient, simple and economic solution to these problems involves the use of a portion of the treated water stream recovered when the polysulfide is decomposed to scrub at relatively low pressure, the $H_2S$ and $NH_3$ from the vent gases separated from the oxidation step effluent stream. Moreover, my solution involves the coupling of a combination scrubbing and fractionation step operated at relatively high pressure with this vent gas scrubbing step. This combination step operates on the overhead vapor stream from the polysulfide decomposition step and the bottom water stream from the vent gas scrubbing step to produce an ammoniacal aqueous stream which is substantially free of sulfide. Some of the broad advantages associated with this method of recovery of sulfide from the effluent from the oxidation step are: (1) it maximizes liquid loading on the vent gas scrubbing step, (2) it significantly increases the yield of sulfur from the process, (3) it provides an ammonia-containing product stream which is substantially free of sulfide, (4) it simplifies the resulting process by combining in a single zone a scrubbing step with a fractionation step, and, (5) it enhances the sulfide-carrying capacity of the recycle water stream used in the process.

It is, accordingly, one object of my invention to provide an improvement in a process for treating a water stream containing ammonium sulfide salt to produce elemental sulfur and ammonia. A second object is to increase the yield of elemental sulfur from a treatment process which catalytically oxidizes ammonium sulfide salts contained in an aqueous stream to ammonium polysulfide. A third object is to provide a simple economical method for recovering unreacted sulfide from the various output streams associated with a process of the type described herein. Still another broad object is to control a source of water pollution by chemical, petroleum, steel and the like industries.

In a broad embodiment, the present invention is a process for treating a water stream containing $NH_4HS$ to produce elemental sulfur, an ammoniacal aqueous stream, and a treated water stream wherein the amount of unreacted sulfide lost from the system is held to a low level. In the first step of the process, the water stream containing $NH_4HS$, an airstream and an aqueous recycle stream containing $NH_4HS$, $NH_4OH$ and $(NH_4)_2SO_3$ are contacted with a solid catalyst at oxidizing conditions sufficient to produce an effluent stream containing ammonium polysulfide, $NH_4OH$, $(NH_4)_2S_2O_3$, $H_2O$, $N_2$ and unreacted $NH_4HS$. The second step involves separating the effluent stream from the first step into a gas stream containing $N_2$, $H_2O$, $H_2S$ and $NH_3$ and a water stream containing ammonium polysulfide, $NH_4OH$, $(NH_4)_2S_2O_3$, and typically some unreacted $NH_4HS$. In the third step, the water stream from the second step is subjected to polysulfide decomposition conditions effective to produce an overhead vapor stream containing $NH_3$, $H_2S$ and $H_2O$, and an aqueous bottom stream containing elemental sulfur and $(NH_4)_2S_2O_3$. The fourth step comprises separating sulfur from the bottom stream from the third step to form a treated water stream containing a minor amount of $(NH_4)_2S_2O_3$. A first portion of the treated water stream from the fourth step is thereafter recovered in the fifth step as a treated water product stream which is substantially free of $NH_4HS$. In the sixth step, the remaining portion of the treated water stream from the fourth step is contacted with the gas stream from the second step in a scrubbing zone at countercurrent liquid-gas contact conditions, including a relatively low pressure, effective to form a nitrogen-rich overhead gas stream which is discharged from the system and an aqueous bottom stream containing $(NH_4)_2S_2O_3$, $NH_4OH$, and $NH_4HS$. The seventh step comprises introducing the overhead vapor stream from the third step into the lower region of a rectifying column while simultaneously introducing the aqueous bottom stream from the fifth step into the rectifying column at a point above the point of introduction of the overhead vapor stream from the third step. The rectifying column is then operated under reflux conditions, including a relatively high pressure, sufficient to form a substantially sulfide-free, ammoniacal aqueous overhead stream and an aqueous bottom stream containing $(NH_4)_2S_2O_3$, $NH_4OH$ and $NH_4HS$. And the last step involves the recycle of the bottom stream from the rectifying column to the first step of the process.

Other embodiments and objects of the present invention encompass details about particular input streams, output streams and mechanics associated with each of the essential steps thereof, and are hereinafter disclosed in the following discussion of these steps.

As pointed out hereinbefore, the water stream charged to the process of the present invention contains an ammonium sulfide salt. This salt can be either ammonium sulfide or ammonium hydrosulfide or a mixture thereof. When the ammonium sulfide salt is ammonium hydrosulfide, the process of the present invention is particularly effective, and in most applications the water stream feed will contain this salt. The amount of the salt contained in the water stream feed may vary over a wide range up to the solubility limit of the salt in water at the conditions utilized in the first step of the present invention. More frequently, the amount of sulfide salt will be sufficient to constitute about 1 to about 10 weight percent, calculated as elemental sulfur, of the aqueous waste stream. For example, a typical water stream recovered from a hydrocracking process contains about 2.3 weight percent sulfur as $NH_4HS$. Typically, the water stream will contain excess amounts of $NH_3$ relative to the amount of $H_2S$ absorbed therein, but very rarely will contain more $H_2S$ than $NH_3$ because of the relatively low solubility of $H_2S$ in an aqueous solution containing a ratio of $H_2S$ to dissolved $NH_3$ greater than about 1:1.

It is to be noted that it is preferred that the sulfide concentration of the water stream feed be at a relatively high level accordingly, for relatively dilute water streams, it is preferred to subject the stream first to a suitable stripping step in order to produce a relatively concentrated feed stream for input to the process of the present invention.

According to the present invention, the water stream feed is passed to an oxidation step wherein it is catalytically treated, in a treatment zone, with oxygen at oxidizing conditions selected to produce an aqueous effluent stream containing ammonium polysulfide, $NH_4OH$, $(NH_4)_2S_2O_3$, and unreacted $NH_4HS$. In some cases, it is advantageous to remove dissolved or entrained oil contained in this water stream by means of any suitable settling or scrubbing operation, prior to passing this stream to this oxidation step; however, in most cases, this pretreatment procedure is not necessary and the water stream feed is charged directly to the oxidation step. An essential feature of the present invention is the commingling of the water stream feed with an aqueous recycle stream containing unreacted sulfide recovered from the effluent stream from the oxidation step. This aqueous recycle stream may be commingled with the water stream feed prior to its being passed into the treatment zone; on the other hand, this aqueous recycle stream can be injected into the treatment zone at a plurality of injection points spaced along the direction of flow of the aqueous stream through the treatment zone. The principal advantage of this latter procedure is that the recycle stream acts as a quench stream for the exothermic reactions taking place within the treatment zone. Another advantage associated with this procedure is that the concentration of $NH_4HS$ charged to the oxidation step is increased. Since it has been determined that the selectivity of the oxidation reaction for elemental sulfur increases with the concentration of sulfide charged to the oxidation step, the presence of sulfide in the recycle stream can be used to increase the selectivity for sulfur of the oxidation step. In fact, it is a preferred procedure to use the aqueous recycle stream to maintain the concentration of ammonium hydrosulfide in the combined water stream charged to this step at about 4 to about 8 weight percent calculated as elemental sulfur.

The catalyst utilized in the oxidation step is any suitable solid catalyst that is capable of effecting conversion of the ammonium sulfide salt contained in the water stream. Two particularly preferred classes of catalyst for this step are metallic sulfides, particularly iron group metallic sulfides, and metal phthalocyanines.

The preferred metallic sulfide catalyst is selected from the group consisting of the sulfides of nickel, cobalt, and iron, with nickel sulfide being especially preferred. Although it is possible to perform this oxidation step with a slurry of metallic sulfide particles, it is preferred that the metallic sulfide be combined with a suitable carrier material. Examples of suitable carrier materials are: charcoals, such as wood charcoal, bone charcoal, etc., which charcoals may or may not be activated prior to use; refractory inorganic oxides such as alumina, silica, zirconia, bauxite, etc.; activated carbons such as those commercially available under trade names of Norit, Nuchar, and Darco and other similar carbon materials familiar to those skilled in the art. In addition, other natural or synthetic highly porous inorganic carrier materials such as various forms of clay, kieselguhr, etc., may be used if desired. The preferred carrier materials for the metallic sulfide catalyst are alumina, particularly alpha-, gamma-, and eta-alumina, and activated charcoal. Thus, nickel sulfide combined with alumina or nickel sulfide combined with activated carbon are particularly preferred catalysts for the oxidation step. In general, the metallic sulfide is preferably combined with the carrier material in amounts sufficient to result in a final composite containing about 0.1 to about 30 or more percent weight of the metallic component, calculated as the elemental metal. For the preferred nickel sulfide catalyst, excellent results are obtained with about 1 to about 15 weight percent nickel as nickel sulfide. Accordingly, examples of particularly preferred catalytic composites for use in the oxidation step are: about 1 to about 15 weight percent nickel as nickel sulfide on an activated carbon support or on an alumina support.

An especially preferred catalyst for use in the oxidation step is a metal phthalocyanine compound combined with a suitable carrier material. Particularly preferred metal phthalocyanine compounds include those of cobalt and vanadium. Other metal phthalocyanine compounds that may be used include those of iron, nickel, copper, molybdenum, manganese, tungsten, and the like. Moreover, any suitable derivative of the metal phthalocyanine may be employed including the sulfonated derivatives and the carboxylated derivatives. Any of the carrier materials previously mentioned in connection with the metallic sulfide catalysts can be utilized with the phthalocyanine compound; however, the preferred carrier material is activated carbon. Hence, a particularly preferred catalyst for use in the oxidation step comprises a cobalt or vanadium phthalocyanine sulfonate combined with an activated carbon carrier material. Addition details as to alternative carrier materials, methods of preparation, and the preferred amounts of catalytic components are given in the teachings of U.S. Pat. No. 3,108,081 for these phthalocyanine catalysts.

Although the oxidation step can be performed according to any of the methods taught in the art for simultaneously contacting a liquid stream and a gas stream with a solid catalyst, the preferred system involves a fixed bed of the solid catalyst disposed in a treatment zone. The water stream is then passed therethrough in either upward, radial, or downward flow and the oxygen stream is charged in either concurrent or countercurrent flow relative to the water stream. The preferred procedure is to operate downflow with both streams being charged in concurrent fashion. Because one of the products of this oxidation step is elemental sulfur, there is a substantial catalyst contamination problem caused by the deposition of this elemental sulfur on the fixed bed of the catalyst. In order to avoid sulfur deposition on the catalyst, it is necessary to operate the oxidation step so that the next sulfur made in this step is reacted with excess sulfide to form a water-soluble ammonium polysulfide. That is to say, in order to prevent a deposition of sulfur on the catalyst bed with resulting deactivation of the catalyst, it is essential that the oxidation step is operated in a manner so that sufficient unreacted sulfide remains available to react with the sulfur produced in the primary oxidation reaction to form a water-soluble ammonium polysulfide.

In order to effect the polysulfide formation in the oxidation step, the amount of oxygen injected into the treatment zone must be carefully regulated so that oxygen is reacted therein in an amount less than the stoichiometric amount required to oxidize all of the ammonium sulfide salt charged to this step to elemental sulfur. Since the stoichiometric amount of oxygen is 0.50 mols of oxygen per mol of sulfide, it is essential that the amount of oxygen charged to the oxidation step is sufficient to react less than 0.50 mols of $O$ per mol of sulfide, and, preferably, about 0.25 to about 0.45 mols of oxygen per mol of sulfide salt. It is especially preferred to operate the oxidation step with an amount of oxygen sufficient to react about 0.4 mols of oxygen per mol of sulfide charged to this step. Accordingly, the amount of oxygen charged to the oxidation step is selected such that sufficient unreacted sulfide remains available to form a water-soluble ammonium polysulfide with the elemental sulfur which is the product of the primary oxidation reaction. Since 1 mol of sulfide will react with many atoms of sulfur (it is typically about 4 atoms of sulfur per mol of sulfide), it is generally only necessary that a small amount of sulfide remain unoxidized.

An essential reactant for this oxidation step is oxygen. In general, because of economic factors it is preferred to utilize an airstream to supply the necessary oxygen.

Regarding the conditions utilized in the oxidation step, it is preferred to utilize a temperature in the range of about 30 to about 400 F., with a temperature of about 80 to about 300 F. yielding best results. The sulfide oxidation reaction is not too sensitive to pressure, and, accordingly, any pressure which maintains the water stream substantially in the liquid phase may be utilized. In general, it is preferred to operate at the lowest possible pressure which is sufficient to maintain the elemental sulfur in combination as the water-soluble ammonium polysulfide, and although pressures of about 1 to about 75 p.s.i.g. may be used, a pressure of about 1 to about 10 p.s.i.g. is particularly preferred. Additionally, it is preferred to operate on the basis of a combined stream liquid hourly space velocity, which is defined as the volume charge rate per hour of the water stream feed plus the aqueous recycle stream divided by the total volume of the catalyst bed and which is preferably selected from the range of about 0.6 to about 20.0 hr., with the value of about 1 to about 10 hr. giving best results.

Following the oxidation step, an effluent stream is withdrawn therefrom and found to contain ammonium polysulfide, $NH_4OH$, $(NH_4)_2S_2O_3$, $H_2O$, $N_2$ and unreacted $NH_4HS$, and typically unreacted $O_2$. In the second step of the present invention, this stream is passed to a separating zone and therein separated into a vent gas stream containing $N_2$, $H_2O$, $H_2S$, $NH_3$, and typically unreacted $O_2$ and a water stream containing ammonium polysulfide, $NH_4OH$, $(NH_4)_2S_2O_3$ and typically some unreacted $NH_4HS$. This separation step is preferably performed at the temperature and pressure maintained at the outlet from the oxidation step.

The water stream from this separation step is then passed to a polysulfide decomposition step. In this step, the ammonium polysulfide is decomposed to yield $NH_3$, $H_2S$ and elemental sulfur. Although the polysulfide can be decomposed according to any of the methods taught in the art, the preferred procedure involves subjecting it to conditions, including a temperature in the range of about 200 F. to about 350 F. and a pressure of about 15 to 75 p.s.i.g., sufficient to form an overhead vapor stream containing $NH_3$, $H_2S$, $H_2O$ and an aqueous bottom stream containing elemental sulfur in admixture with an aqueous stream containing a minor amount of $(NH_4)_2S_2O_3$. In many cases, it is advantageous to accelerate the polysulfide decomposition reaction by stripping $H_2S$ and $NH_3$ from the polysulfide solution with the aid of a suitable inert gas such as steam, nitrogen, air, flue gas, etc., which can be injected into the bottom of the decomposition zone. Moreover, upflowing vapors may be generated by supplying heat to the bottom of the zone by means such as a steam coil or reboiler in order to accelerate the decomposition reaction.

When the temperature utilized in the bottom of the decomposition zone is less than the melting point of sulfur, the elemental sulfur will be present in the form of a slurry of solid particles in the aqueous bottom stream. This slurry-containing bottom stream is then subjected, in a sulfur separation step, to any of the techniques taught in the art for removing a solid from a liquid such as filtration, settling, centrifuging, etc., to remove the elemental sulfur therefrom and to form a treated water stream containing a minor amount of $(NH_4)_2S_2O_3$. In the case where the decomposition temperature utilized is greater than the melting point of sulfur, the bottom stream will contain a dispersion of liquid sulfur in the aqueous stream, and this mixture can be passed to a suitable separation step wherein the liquid sulfur can be allowed to settle out and form a separate liquid sulfur phase. In this last case, the separation of the elemental sulfur from the treated water stream can be performed, if desired, within the decomposition zone by allowing the liquid sulfur to collect at the bottom of this zone and separately drawing off the treated water stream and a liquid sulfur stream. This last mode of operation is facilitated by the relatively rapid rate that liquid sulfur will separate from the water stream. Regardless of how the sulfur is separated, a treated water stream containing a minor amount of $(NH_4)_2S_2O_3$ is recovered from this sulfur separation step.

A first portion of this treated water stream recovered from the sulfur separation step is recovered as a treated water product stream. This product stream is substantially free of sulfide and contains only a relatively small amount of thiosulfate; typically about 0.01 to about 0.5 weight percent ammonium thiosulfate calculated as elemental sulfur. It has greatly reduced biological oxygen demand and, accordingly, can be safely discharged into a suitable sewer. In many cases, it can be recycled to its point of origin for further use therein.

The remaining portion of the treated water stream is charged to a gas scrubbing step where it countercurrently contacts the vent gas stream from the second step. This step is typically effected in a vertically positioned tower containing suitable contacting means for achieving intimate contact between the gas and liquid streams. This step is usually performed at a temperature which is relatively lower than that used in the gas separation step. Likewise, the pressure used is a relatively low pressure corresponding to that utilized in the gas separation step, and is preferably about 1 to about 10 p.s.i.g. Because all of the treated water stream not recovered as a product stream is charged to this step instead of a portion of it being used for scrubbing the overhead stream from the polysulfide decomposition step, this scrubbing step is operated at a relatively high liquid-gas loading resulting in more efficient removal of $NH_3$ and $H_2S$ from the gas stream charged thereto. A nitrogen-rich overhead gas stream is then withdrawn from this step and vented from the system. Similarly, an aqueous bottom stream containing $NH_4HS$ and $NH_4OH$, resulting from the absorption of $NH_3$ and $H_2S$, and $(NH_4)_2SO_3$ is withdrawn therefrom.

It is an essential feature of the present invention that the overhead vapor stream withdrawn from the polysulfide decomposition is charged as a vapor into the lower region of a rectifying column containing suitable contacting means. Moreover, the bottom stream withdrawn from the gas scrubbing step is simultaneously charged to the middle region of this rectifying column. This column is fitted with a suitable overhead condenser in order to provide a reflux stream. It is operated with a bottom temperature of about 200° to about 325° F. and with a top temperature which is about 25° to about 200° F. lower than that maintained in the bottom of the column. The pressure used therein is a relatively high pressure, corresponding to that utilized within the decomposition step; that is, preferably about 15 to about 75 p.s.i.g. Because the solubility of $H_2S$ in an ammoniacal solution is increased at higher pressures, the use of a pressure which is relatively high compared to the pressure used in the scrubbing step in this rectifying column increases the sulfide-carrying capacity of the water stream charged thereto by suitably varying the temperatures of the input water and vapor streams to this step, the amount of reflux and the temperature of the reflux stream, the rectifying column is operated to produce an ammoniacal aqueous overhead stream which is substantially free of sulfide and contains ammonia in a relatively high concentration, and an aqueous bottom stream containing $(NH_4)_2S_2O_3$, $NH_4OH$ and an amount of $NH_4HS$ essentially corresponding to the amount of sulfide contained in the effluent from the oxidation step.

The bottom stream from this rectifying column is then recycled to the oxidation step, as previously explained, in order to increase the net yield of elemental sulfur from the process.

Having broadly characterized the essential steps comprising the process of the present invention, reference is now had to the attached drawing for a detailed explanation of a preferred flow scheme employed therein. The attached drawing is merely intended as a general representation of a preferred flow scheme with no intent to give details about vessels, heaters, condensers, pumps, compressors, valves, process control equipment, etc., except where knowledge of these devices is essential to an understanding of the present invention or would not be self-evident to one skilled in the art. In addition, in order to provide a working example of a preferred mode for carrying out the present invention, the attached drawing is discussed with reference to a specific water stream feed and a specific embodiment of each of the steps of the present invention. Moreover, it is understood that the description given in conjunction with the discussion of the attached drawing relates to a treating process that has been started up and is producing an aqueous recycle stream.

Referring now to the attached drawing, a water stream feed containing about 5 weight percent sulfur as ammonium hydrosulfide enters the process through line 1 and is commingled with an airstream at the junction of line 2 with line 1 and with an aqueous recycle stream at the junction of line 20 with line 1. The resulting mixture is heated in a suitable heating means, not shown, to a temperature of about 140° F. and passed into treatment zone 3. The amount of oxygen contained in the airstream is sufficient to react about 0.38 mols of oxygen per mol of sulfide charged to zone 3. The total amount of ammonium hydrosulfide contained in the water stream feed and the aqueous recycle stream is equivalent to about 6 weight percent sulfur as $NH_4HS$ on a combined stream basis. Furthermore, the aqueous recycle stream contains $(NH_4)_2S_2O_3$. The amount of $(NH_4)_2S_2O_3$ entering zone 3 via the recycle stream is equivalent to about 0.01 to about 1 weight percent sulfur on a combined stream basis; the exact value within these range being dependent upon the exact conditions utilized within the treatment zone 3 coupled with the amount of the treated water product stream withdrawn via line 13 from the process as will be explained below. The aqueous recycle stream will also contain $NH_4OH$ resulting from the operation of zone 18 as hereinafter explained.

Treatment zone 3 contains a fixed bed of a solid catalyst comprising cobalt phthalocyanine monosulfonate combined with an activated carbon carrier material in an amount such that the catalyst contains 1.0 weight percent of the phthalocyanine component. The activated carbon granules used as the carrier material are in a size of 10–30 mesh. The mixture of the water stream feed, the aqueous recycle stream, and the gas stream flow through the bed of catalyst in concurrent downflow fashion. The conditions utilized in the zone 3 are: a temperature of about 140° F. at the inlet to this zone, an outlet temperature of about 185° F., a pressure of about 5 p.s.i.g. and a liquid hourly space velocity based on the total volume of the combined water stream feed and aqueous recycle stream of about 2.0 hr.$^{-1}$. These conditions are sufficient to result in the conversion of about 66 percent of the sulfide charged to this step.

Following the oxidation step, an effluent stream is withdrawn from zone 3 via line 4 and passed to separating zone 5. This effluent stream contains ammonium polysulfide, $NH_4OH$, $(NH_4)_2S_2O_3$, $H_2O$, $N_2$, and unreacted $O_2$ and $NH_4HS$. In zone 5, a vent gas stream comprising nitrogen, $H_2O$, $O_2$, $NH_3$, and $H_2S$ is separated from a liquid water stream containing ammonium polysulfide, $NH_4HS$, $NH_4OH$ and $(NH_4)_2S_2O_3$. This gas stream contains about 4.5 mol. percent $O_2$, 0.65 mol. percent $H_2S$, and 2.01 mol. percent $NH_3$ and the liquid stream contains about 0.28 weight percent S as $(NH_4)_2S_2O_3$, about 3.96 weight percent S as elemental sulfur tied up in the polysulfide, 2.04 weight percent S as sulfide and about 3.0 weight percent $NH_3$. The gas stream leaves separating zone 5 via line 6, and the liquid stream leaves via line 7. Zone 5 is operated at a pressure of 5 p.s.i.g. and a temperature of about 185° F.

The liquid stream from zone 5 is charged via line 7 to polysulfide decomposition zone 8. In this case, polysulfide decomposition zone 8 is a stripping column containing suitable gas liquid contacting means such as fractionating plates, baffles, etc. Heat is supplied to the bottom of this stripper column by means such as a steam coil or reboiler near the bottom of the column. Zone 8 is operated at a bottom temperature of 280° F. and a bottom pressure of 40 p.s.i.g. An overhead vapor stream containing $NH_3$, $H_2S$ and $H_2O$ is withdrawn via line 9, and a bottom stream containing liquid sulfur dispersed in an aqueous solution of ammonium thiosulfate is withdrawn via line 10. Essentially all of the $NH_3$ contained in the input stream to zone 8 is withdrawn therefrom in the overhead vapor stream. The amount of the input stream taken overhead in zone 8 is about 20 vol. percent of the input stream.

The bottom stream from the polysulfide decomposition zone is withdrawn via line 10 at a rate which is sufficient to prevent the liquid sulfur from collecting at the bottom of zone 8. The resulting stream is passed to sulfur recovery zone 11, which in this case is a settling zone wherein the liquid sulfur separates from an aqueous phase. In many cases, the flow parameter within zone 8 can be adjusted such that the separation of the liquid sulfur can occur in the bottom regions of this zone if desired; however, here the separation is performed in a separate settling zone. The liquid sulfur that separates in sulfur recovery zone 11 is withdrawn from the system via line 12. The treated water phase contains a minor amount of ammonium thiosulfate; in this case it is about 0.35 weight percent of this phase calculated as elemental sulfur. It is withdrawn from zone 11 via line 13 and cooled to a temperature of about 100° F. by cooling means not shown. At the junction of line 14 with line 13, the treated water stream is divided into two portions: the first portion is passed via line 14 to scrubbing zone 15, the second is withdrawn from the system via line 13 and constitutes the treated water product stream from the system. This last product stream contains about 100 p.p.m. of $H_2S$, about 300 p.p.m. of $NH_3$ and less than about 0.35 weight percent sulfur as ammonium thiosulfate. It is to be noted that the treated water stream contains about 6 percent of the sulfur originally present in the water stream feed; thus, 94 percent of the sulfur is removed by the process of the present invention. The amount of the first portion of the treated water stream is about one-half the amount of the second on a volume basis. In scrubbing zone 15, the first portion of the treated water stream withdrawn from zone 11 is countercurrently contacted with the vent gas stream withdrawn from zone 5 via line 6 in a suitable scrubbing column containing contacting means. Zone 15 is preferably operated at a low temperature of about 100° F. and a substantially low pressure corresponding to the pressure in the separating zone 5; that is about 5 p.s.i.g. Normally, intimate contact between the gas stream and the liquid stream is effected in a vertically positioned tower at a liquid to gas loading which is sufficient to produce a nitrogen-rich gas stream which exits from the tower near the top thereof via line 16 and an aqueous bottom stream containing $(NH_4)_2S_2O_3$, $NH_4OH$, and $NH_4HS$ which is withdrawn near the bottom of the tower via line 17. The aqueous bottom stream withdrawn via line 17 contains substantially all of the hydrogen sulfide and ammonia which were flashed off in separating zone 5.

The aqueous bottom stream from zone 15 is passed via line 17 to fractionation zone 18. In this case zone 18 is a vertically positioned rectifying column containing suitable gas-liquid contacting means such as a series of spaced sieve plates and having an overhead vapor condenser. The aqueous bottom stream from zone 15 is injected into the middle region of this column. Likewise, the overhead vapor stream from zone 8 is passed via line 9 to the lower region of this column. The point of introduction of the vapor stream is at least several plates below the point of introduction of the bottom stream from zone 15. Intimate contact is achieved in the lower regions of zone 18 between the ascending stream of vapor and the descending water stream. Zone 18 is operated at a bottom temperature of about 275° F. and a relatively high bottom pressure of about 35 p.s.i.g. An overhead vapor stream is withdrawn from the upper region of zone 18, condensed, and a portion of the condensate returned as reflux to the top of the column at a temperature of about 50° F. to 125° F. The remaining portion of the condensate is recovered via line 19 as a substantially sulfide-free ammoniacal aqueous product stream containing about 28 weight percent $NH_3$. An aqueous bottom stream is similarly withdrawn from zone 18 via line 20 and found to contain the net amount of $(NH_4)_2S_2O_3$ and sulfide present in the input streams to this zone plus a minor amount of $NH_4OH$. The bottom stream from zone 18 is then cooled to a temperature of about 100° to 125° F. by means not shown and recycled via line 20 to zone 3 as previously explained.

The process is operated in the manner indicated and it is determined that the vent gas stream from zone 15 and the ammoniacal product stream recovered via line 19 remains substantially free of sulfide. Accordingly, the present invention provides an efficient solution to the problems caused by the presence of sulfide in the effluent stream from the oxidation step.

I claim as my invention:

1. A process for treating a water stream containing $NH_4HS$ to produce elemental sulfur, an ammoniacal aqueous stream, and a treated water stream, said method comprising, the steps of:
   a. contacting the water stream, an airstream, and an aqueous recycle stream containing $NH_4HS$, $NH_4OH$ and $(NH_4)_2SO_3$ with a solid catalyst at oxidizing conditions sufficient to produce an effluent stream containing ammonium polysulfide; $NH_4OH$, $(NH_4)_2S_2O_3$, $H_2O$, $N_2$ and unreacted $NH_4HS$;
   b. separating the effluent stream from step (a) into a gas stream containing $N_2$, $H_2O$, $H_2S$ and $NH_3$ and a water stream containing ammonium polysulfide, $NH_4OH$ and $(NH_4)_2SO_3$;
   c. subjecting the water stream from step (b) to polysulfide decomposition conditions effective to produce an overhead vapor stream containing $NH_3$, $H_2S$ and $H_2O$ and an aqueous bottom stream containing elemental sulfur and $(NH_4)_2SO_3$;
   d. separating sulfur from the bottom stream from step (c) to form a treated water stream containing a minor amount of $(NH_4)_2S_2O_3$;
   e. recovering a first portion of the treated water stream from step (d) as a treated water product stream which is substantially free of $NH_4HS$;
   f. contacting the remaining portion of the treated water stream from step (d) with the gas stream from step (b), in a scrubbing zone at countercurrent liquid-gas contact conditions including a relatively low pressure, effective to form a nitrogen-rich overhead gas stream and an aqueous bottom stream containing $NH_4OH$, $(NH_4)_2S_2O_3$ and $NH_4HS$;
   g. introducing the overhead vapor stream from step (c) into the lower region of a rectifying column, introducing the aqueous bottom stream from step (f) into the rectifying column at a point above the point of introduction of the overhead vapor stream from step (c), and operating the rectifying column under reflux conditions including a relatively high pressure, sufficient to form a substantially sulfide-free, ammoniacal aqueous overhead stream, and an aqueous bottom stream containing $(NH_4)_2S_2O_3$, $NH_4OH$, and $NH_4HS$, the amount of sulfide contained in this last stream being substantially all of the sulfide contained in the effluent stream from step (a); and,
   h. recycling the bottom stream from step (g) to step (a).

2. A process as defined in claim 1 wherein the catalyst utilized in step (a) is a phthalocyanine catalyst.

3. A process as defined in claim 1 wherein the catalyst utilized in step (a) comprises an iron group metallic sulfide combined with a carrier material.

4. A process as defined in claim 1 wherein the catalyst utilized in step (a) is cobalt phthalocyanine monosulfonate combined with an activated carbon carrier material.

5. A process as defined in claim 1 wherein the amount of oxygen charged to step (a) is sufficient to react about 0.4 mols of oxygen per mol of sulfide charged to said step.

6. A process as defined in claim 1 wherein the oxidizing conditions utilized in step (a) include a temperature of about 80° to about 300° F., a pressure of about 1 to about 10 p.s.i.g. and a combined stream liquid hourly space velocity of about 1.0 to about 10.0 hr.$^{-1}$.

7. A process as defined in claim 1 wherein the polysulfide decomposition conditions include a temperature of about 200° to about 350° F. and a pressure of about 15 to about 75 p.s.i.g.

8. A process as defined in claim 1 wherein the concentration of ammonium hydrosulfide in the aqueous waste stream plus the aqueous recycle stream being charged to step (a) is about 4 to about 8 weight percent on a combined stream basis.

9. A process as defined in claim 1 wherein said relatively low pressure used in step (f) is about 1 to 10 p.s.i.g. and wherein said relatively high pressure utilized in step (g) is about 15 to about 75 p.s.i.g.

* * * * *